Patented Apr. 20, 1948

2,439,880

UNITED STATES PATENT OFFICE 2,439,880

TUNGSTEN-MOLYBDENUM TRIOXIDE CATALYST

Herrick R. Arnold, New Castle County, Del., assignor to E. I. du Pont de Nemours & Company, Wilmington, Del., a corporation of Delaware No Drawing. Application October 13, 1942, Serial No. 461,896

2 Claims. (Cl. 252—232)

This invention relates to the production of a new catalyst and more particularly, it relates to a new catalyst for the catalytic oxidation of alcohols to aldehydes and ketones.

This application is a continuation-in-part of application Serial No. 322,932, filed March 8, 1940 (now U. S. Patent 2,320,253, dated May 25, 1943).

This invention has as an object to provide a new catalytic composition. Another object is to provide a new and improved oxidation catalyst. Still another object is to provide a new catalyst which is effective in converting alcohols to aldehydes and ketones and which is particularly effective in converting methanol to formaldehyde. Another object is to provide methods for the preparation of these new and improved catalysts. Other objects will be apparent from the reading of the following description of the invention.

These objects are accomplished by the following invention which comprises mixing or intimately associating an oxide of molybdenum with an oxide of tungsten in a mole ratio within the range of 10:1 to 1:10. The catalyst so obtained has been found to be particularly useful for the catalytic oxidation of methanol to formaldehyde at temperatures within the range of about 225° to about 450° C. This catalyst is best prepared by acidifying intimately commingled finely ground wet mixtures of ammonium salts of tungsten and molybdenum.

The following examples are submitted by way of illustration and not as limiting the invention.

Example I

A catalyst containing the oxides of molybdenum and tungsten in approximately equimolar proportions is prepared by igniting a mixture of the ammonium para-salts of molybdic and tungstic acids as follows: 354 g. of ammonium para-molybdate, and 540 g. of ammonium para-tungstate are ground together to a dry, powdered, mixture passing a 60-mesh screen. This mixture is then ignited to constant weight by heating at 375° to 400° C. After cooling to room temperature, the dry powder is kneaded to a thick, moist, dough-like mass with approximately 10% by weight of water, and dried to a hard, porous, cake at 110° to 120° C. The resulting solid mass, consisting throughout of a mixture of the oxides of molybdenum and tungsten, is then broken into granules of 4 to 10 mesh size and baked at 375° to 400° C. for 20 hours.

A mixture of air and methanol vapor, containing 10% by weight of methanol, is preheated and passed continuously at the rate of 0.3 cubic feet per hour, over 65 cc. of the catalyst maintained at 260° to 310° C. The effluent product is cooled and passed through water whereby an aqueous solution of formaldehyde and unchanged methanol, containing an amount of formic acid equivalent to less than 0.1% of the methanol, is obtained. Under these conditions a methanol conversion of 82 to 83% is obtained in one passage of the vapor mixture over the catalyst, with yields of formaldehyde amounting to 85 to 87%. These conversions and yields are maintained without diminution for a period of about 70 hours.

Example II

A more active catalyst than the one described above, and containing the oxides of tungsten and molybdenum in the molar ratio $WO_3/MoO_3 = 1.22$, is prepared by the following improved method: 263.4 g. of ammonium para-molybdate and 430.2 g. of ammonium para-tungstate are ground to a thick, uniform paste with 276 cc. of water. To the finely ground slurry there is added, with stirring, 350 cc. of a 42.5% solution of nitric acid whereby a finely coagulated mixture of hydrated molybdic and tungstic acids is precipitated in a semi-gelatinous form. The precipitate is isolated by filtration and washed on the filter with 750 cc. of water, dried at 110° to 120° C., and baked for 5 hours, starting at 210° C. and increasing the temperature to 315° C., after which the baking is continued at 315° to 320° C. for an additional 2 hours. The resulting hard, porous, homogeneous mass is then sized to 4 to 10 mesh granules. Sixty-five cc. of the catalyst, placed in a suitable converter, is heated to 258° C. A mixture of air and methanol vapor containing 8 to 10% of methanol is preheated and passed continuously over the catalyst at the rate of 0.295 cu. ft. per minute. Under these conditions the time of contact of the air-methanol mixture with the catalyst is about 0.24 sec. Approximately 93 to 95% of the methanol introduced into the catalyst chamber is recovered, in a single passage over the catalyst, as formaldehyde in the finished product, the remainder of the methanol being recovered unchanged, or as formic acid equivalent to less than 0.1% of the methanol passed. When the reaction temperature is increased to 305° C., 97 to 100% conversion of the methanol to formaldehyde is obtained with no appreciable increase in the formation of formic acid.

Example III

The durability of life of the catalyst prepared in accordance with Example II, is still further improved by introducing into the method of preparation described in Example II the additional step of oxidizing the catalyst to its highest state of oxidation (namely to a mixture of the catalytic oxides of molybdenum and tungsten consisting substantially of mixtures of their trioxides). This step is accomplished by subjecting a catalyst prepared according to Example II, above, to a heat treatment at temperatures of approximately 450° C. in a stream of air or oxygen for periods of 14 to 48 hours whereby the lower oxides of molybdenum and tungsten are converted to the trioxides. Simultaneously the high temperature oxidation treatment has the effect of hardening the catalyst and making it more resistant to erosion and disintegration during use.

When a mixture of air and methanol vapor containing 8 to 10% by weight of methanol is preheated and passed at the rate of 0.3 cu. ft. per minute over 65 cc. of the catalyst, prepared as described in this example, and maintained at 250° to 320° C., substantially 92% to 95% of the methanol fed into the catalyst chamber is recovered as formaldehyde in the finished product over a period of about 1000 hours of continuous operation.

Example IV

Octyl alcohol is fed continuously at the constant rate of 61.7 g. per hour into a vaporizing and preheating chamber where it is vaporized and mixed continuously with 2.9 times its weight of air. The air-alcohol mixture is preheated to 300° C. and passed continuously at atmospheric pressure over 22.5 cc. of the catalyst prepared as described in Example II heated to between 280 and 300° C. The time during which the air-alcohol mixture remains in contact with the catalyst is about 0.26 second. Under these conditions 66% of the octyl alcohol is oxidized to octanal, and 95.2% of the alcohol processed is recovered as aldehyde and unchanged alcohol.

Similar yields of butyraldehyde, isobutyraldehyde, and cyclohexanone are obtained by oxidizing, respectively, n-butanol, iso-butanol, and cyclohexanol under the same conditions described above.

Although the foregoing examples have illustrated certain methods for preparing the catalysts and the manner of their use in the oxidation of alcohols to aldehydes and ketones it is to be understood that many modifications and extensions of the invention may be made without departing from the spirit and scope thereof.

The catalysts contemplated in this invention comprise 10:1 to 1:10 mixtures of the oxides of molybdenum and tungsten. These molybdic oxide-tungstic oxide catalyst compositions may be modified by incorporating therein a third oxide which acts as a promoting or modifying agent. Examples of such oxides are the oxides of uranium, chromium, iron, manganese, copper, cadmium, vanadium, etc. It is known that these two elements may exist in many states of oxidation and all possible combinations of these oxides are to be recognized as coming within the scope of this invention. Although the preferred mixtures are those consisting of and which contain these oxides in approximately equimolar ratios, mixtures of the so-called "blue" oxides of tungsten and molybdenum, as well as their dioxides and sesqui-oxides, are also contemplated within the scope of this invention.

The oxide catalysts may be prepared in a number of different ways, as for example: by simple mixing or grinding together of molybdic and tungstic anhydrides with sufficient water to form a thick paste and subsequently, drying, baking, and sizing the resulting product. A still better method consists of igniting intimate mixtures of the ammonium salts of the metals. It is preferred, however, to coprecipitate hydrated molybdic and tungstic acids in suitable proportions by acidifying wet mixtures of the finely ground ammonium salts with an excess of nitric or hydrochloric acids or mixtures of these acids, and drying and baking the resulting coagulated, semi-gelatinous precipitate. A further step in the preferred method consists in finally subjecting the catalyst to treatment in an oxidizing atmosphere at elevated temperatures, preferably in the range 350° to 450° C., to convert the oxide mixture to the trioxides or highest state of oxidation, whereby a bright orange or yellow, porous, granular catalyst is obtained which has sufficient inherent strength to withstand erosion and other factors encountered during use which tend to cause disintegration of the catalyst.

Further improvements in physical strength of the catalyst may be made by briquetting the catalyst or by introducing binders such as colloidal silica. In some cases it may be desirable or even preferable to apply the catalytic masses to carrier substances or surface-extending agents such as silica gel or kieselguhr, or the catalytically active compounds may actually be precipitated or otherwise formed within the pores of the carrier or surface-extending substances.

Considering the oxidation of methanol to formaldehyde as a typical example of the use of the catalyst of this invention, the temperature of the catalyst may vary over a wide range dependent upon such other factors as time of contact and the particular composition of the catalyst. While the temperatures employed may vary from about 225° C. to about 450° C., it is ordinarily preferred to operate within the range 250° to 350° C.

The ratio of methanol to air used with these catalysts may also vary considerably, although usually the air is used in greater than the theoretical quantity required to oxidize the alcohol to formaldehyde. Mixtures containing 5 to 20% by weight of methanol in the form of vapor may be employed, but it is ordinarily preferred to use mixtures containing 8 to 10% by weight of methanol. In place of methanol any primary or secondary alcohol may be converted to the corresponding aldehyde or ketone. The alcohol may be aromatic, aliphatic, or a cycloaliphatic alcohol and one that is capable of vaporization.

Wide variations in the time of contact of the gases with the catalyst may be employed depending to some extent upon the temperature, composition, and character of the catalyst. The shortest possible time of contact is of course desirable and this may be as low as a few hundredths of a second, but it is ordinarily found that contact periods of 0.1 to 0.5 second will be most effective.

The use of the oxide catalysts of this invention possesses a number of advantages over the catalysts heretofore used in the oxidation of alcohols. For example it is possible to obtain higher conversions of methanol and higher yields of formaldehyde with less combustion losses, and lower by-products, especially acid, than are possible with catalysts at present known to the art. As contrasted particularly with vanadium oxide catalysts, the molybdenum oxide-tungsten oxide catalysts of this invention produce substantially acid-free formaldehyde. While the catalysts of this invention may be used for the oxidation of any alcohol, they are particularly useful in the conversion of methanol to formaldehyde.

The catalysts have the additional advantage that they possess considerable inherent strength so that they do not necessarily require the use of a support, and can be used for long periods without appreciable erosion or disintegration. Furthermore, although they are catalytically active at relatively low temperatures, they are quite resistant to high temperatures of the order of 450° to 550° C. or higher, where many catalysts ordinarily sinter and become inactive. They are comparatively insensitive, also, to the usual catalyst "poisons" such as sulfur and its compounds.

It is apparent that many widely different embodiments of this invention may be made without departing from the spirit and scope thereof and therefore it is not intended to be limited except as indicated in the appended claims.

I claim:

1. An oxidation catalyst composition consisting of an intimate mixture of the trioxides of tungsten and molybdenum in which the mole ratios of the trioxides varies from 10:1 to 1:10, said catalyst being porous and granular in nature and of bright orange-yellow color.

2. An oxidation catalyst composition as defined in claim 1 characterized in that the trioxides are present in equimolecular proportions.

HERRICK R. ARNOLD.

REFERENCES CITED

The following references are of record in the file of this patent:

UNITED STATES PATENTS

| Number | Name | Date |
|---|---|---|
| 1,985,792 | Meerweim et al. | Dec. 25, 1934 |
| 1,998,626 | Koenig | Apr. 23, 1935 |
| 2,002,997 | Herold et al. | May 28, 1935 |
| 2,042,285 | Wilke et al. | May 26, 1936 |
| 2,124,388 | Weiss et al. | July 19, 1938 |
| 2,137,275 | Ellis | Nov. 22, 1938 |
| 2,198,545 | Levine | Apr. 23, 1940 |
| 2,217,865 | Groll et al. | Oct. 15, 1940 |
| 2,268,109 | Connolly | Dec. 30, 1941 |

FOREIGN PATENTS

| Number | Country | Date |
|---|---|---|
| 17320/28 | Australia | Aug. 6, 1929 |
| 349,444 | Great Britain | Nov. 24, 1930 |
| 740,445 | France | Jan. 26, 1933 |